Figure 1:
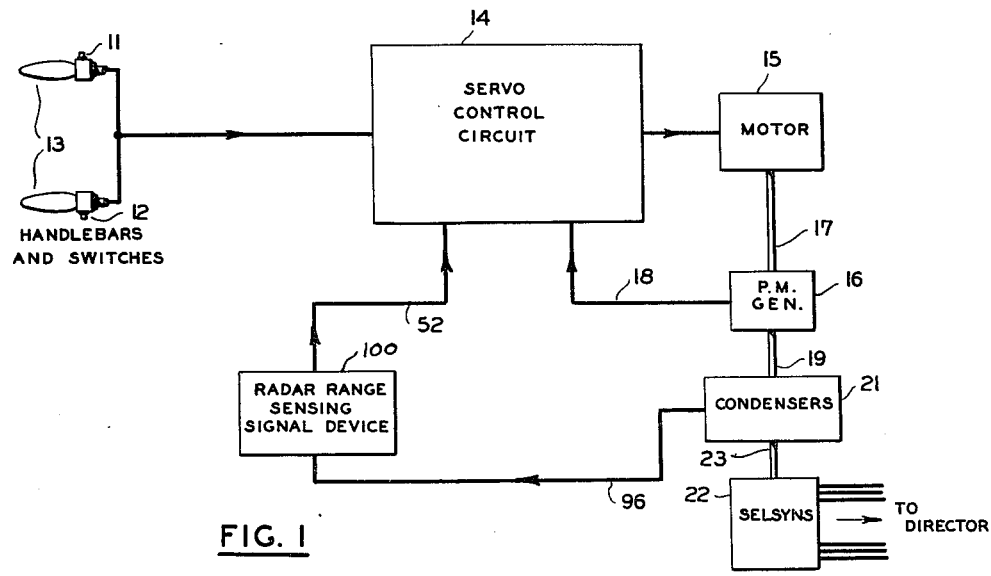

Nov. 7, 1961  R. D. McCOY  3,008,136
SERVO MECHANISM

Filed Aug. 16, 1943  2 Sheets-Sheet 1

INVENTOR
RAWLEY D. McCOY
BY *Paul B. Hunter*
ATTORNEY

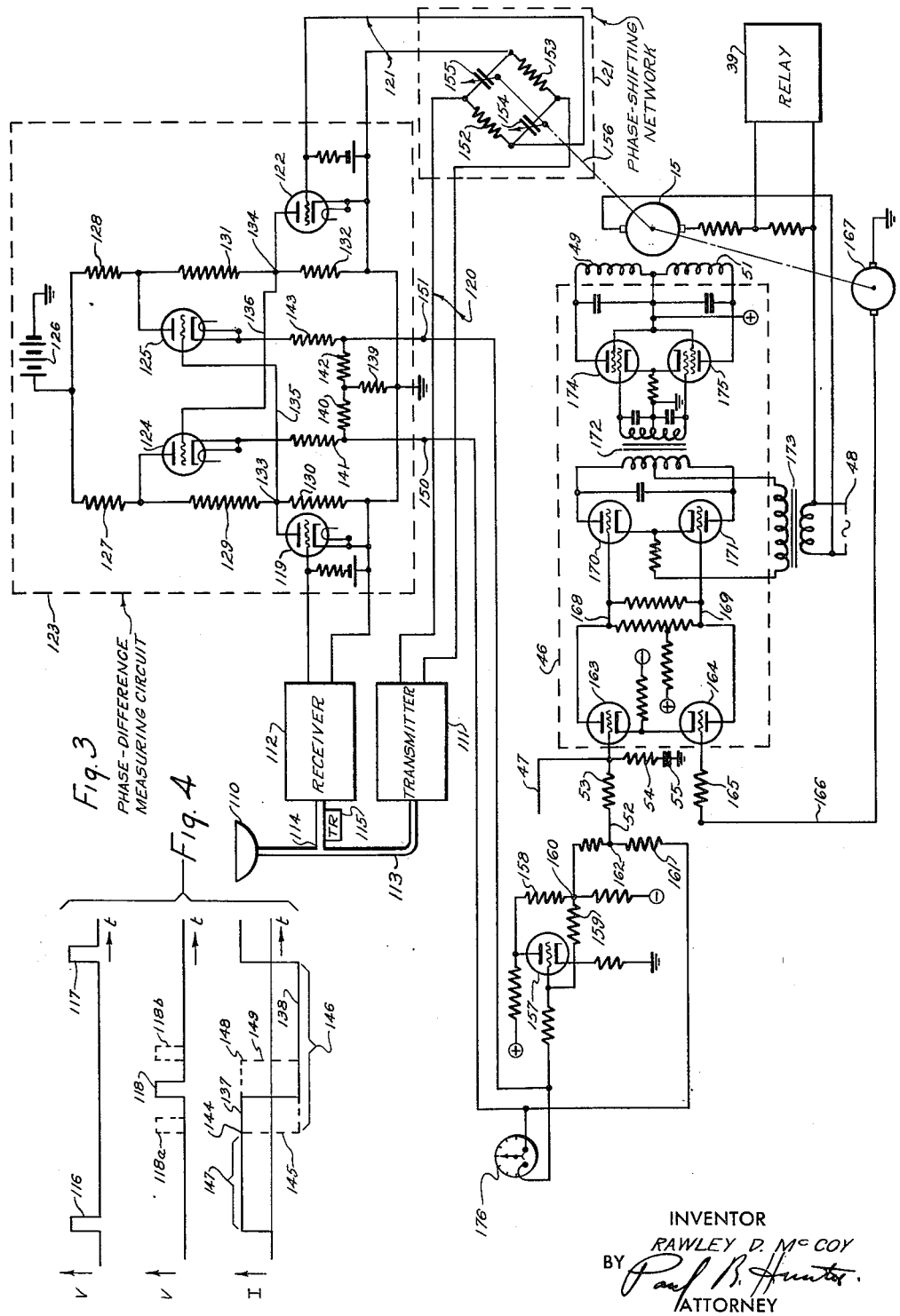

United States Patent Office 3,008,136
Patented Nov. 7, 1961

3,008,136
SERVO MECHANISM
Rawley D. McCoy, Bronxville, N.Y., assignor to Sperry Rand Corporation, a corporation of Delaware
Filed Aug. 16, 1943, Ser. No. 498,780
18 Claims. (Cl. 343—7)

My invention relates to servo mechanisms and is concerned primarily with multiple speed, multiple control servo systems.

As an object of my invention, I wish to provide an improved multiple speed servo system.

Another object of my invention is to provide an improved multiple speed servo system which is responsive to manually initiated and automatic control.

It is also an object of my invention to provide an improved multiple speed servo system in which a servo motor is operated automatically over a selected range of speeds by a servo controlled device and at a fixed speed by manually actuated overriding control means.

Still another object of my invention is to provide an improved servo system in which an electric servo motor is made responsive to an electronic servo control circuit to automatically operate the same over a selected range of speeds, the control circuit being subject to a manually initiated overriding electrical control for driving the motor at a fixed speed which is appreciably in excess of the maximum speed in the selected range.

Yet another object of my invention is to provide an improved servo system adaptable to an automatic ranging device which will enable the latter to be selectively swung rapidly or "slewed" at a rate in excess of the maximum speed maintained by the automatic ranging control device of the system.

As another object of my invention, I wish to provide an improved servo system of unitary design adaptable to an automatic ranging device, by means of which automatic ranging, aided tracking, and range slewing may be obtained.

Further objects and advantages of my invention will become apparent as the description proceeds.

In carrying out my invention in a preferred embodiment thereof and in connection with an automatic ranging device forming a part of a radio detecting and gun-laying system, an electric motor is employed which is automatically controlled by signals received from the system's range-sensing detector or regenerative range-tracking circuit. Control is imparted to the servo motor through a servo control circuit which varies the amplitude and polarity of the motor's field current and also varies its armature current. An overriding voltage which causes the motor to operate at an accelerated speed is selectively applied to the control circuit by manual circuit closing means, and provision is made for manual ranging by supplying a voltage to the control circuit whose characteristics provide for rate and displacement variations. Damping is supplied to the system by a permanent magnet generator which is mechanically connected to the servo motor and whose output is supplied to the control circuit as a "bucking" voltage. The limits of the system are maintained electrically through cam operated switches.

Figure 2:
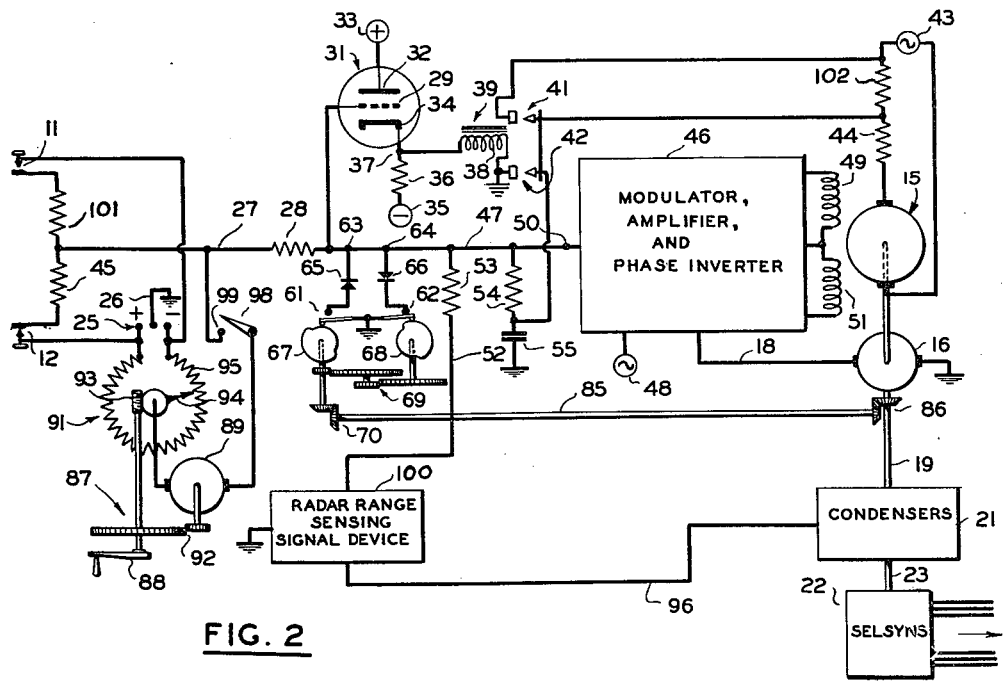

A more comprehensive understanding of my invention will be afforded by the following detailed description when taken together with the accompanying drawing, in which like reference numerals have been used throughout to designate like parts and in which, FIG. 1 is a schematic diagram, partly in block form, of an automatic ranging system wherein my invention is employed;

FIG. 2 shows, in greater detail, the circuit arrangements of the system of FIG. 1;

FIG. 3 is a wiring diagram of various components of the system shown in FIGS. 1 and 2 which cooperate to control the servo motor so as to provide a servo motor output which is a measure of the range of a distant object or target; and FIG. 4 illustrates voltage curves of the pulses which are compared in the phase-difference measuring circuit and a current curve illustrating the differential current flow in the output of said circuit.

Although the improved servo system illustrated in detail in FIG. 2 has general utility and is not limited to use in combination with the apparatus shown in the drawing, it is particularly useful in automatic ranging systems, and accordingly its operation will be described in connection with such apparatus.

In one type of an automatic ranging system, an operator is provided with three range indicating instruments by means of which the range of a target is continuously obtained, as disclosed in copending application Serial No. 506,167 by J. R. Wilkerson, now U.S. Patent No. 2,512,-703, issued June 27, 1950. In this particular type of apparatus one of the range-indicating devices provides a coarse range measurement and also gives to the operator the location of the object which is detected. Another instrument whose maximum range-indicating capacity is somewhat less than the one just described is also provided which visually indicates to the operator the range of the target by projecting on the screen of a cathode ray tube the reflected radio signal which is received from the object. This signal appears as a pulse on a horizontal line, the length of which is graduated in units of range. To condition the system for automatic ranging, it is necessary for the operator to bring an indication of the position of the automatic range-sensing system into coincidence with the signal. The indication of the position of range-sensing system which appears in the form of a dot is brought into alignment with and into a position over the signal. When this condition is reached, a gating circuit is conditioned to permit the reception of reflected signals from the scanned area which is limited in radius to a small portion of the scanned field from which an individual target is selected. Thereafter, through automatic scanning means the target is followed by the detecting system and range is automatically supplied to a computer or to a director for firing purposes.

If it be assumed that the maximum range of the system is fifty thousand yards, the first range indicator will have a maximum range indication of this amount. The second indicator will have a maximum range indication in the order of thirty thousand yards. When the target approaches the detector system to the point where it is registered on the thirty-thousand-yard indicator, it is conceivable that the range-sensing indication may be at any position on the indicator. For example, it may be at the five-thousand-yard position. As stated above, to condition the system for automatic tracking, it is therefore necessary for the operator to move the range-sensing indication into coincidence with the signal, which in this case would necessitate moving it from the five-thousand-yard position to the thirty-thousand-yard position. To accomplish this, the variable parameters of the range circuit must be physically changed either manually or by some other means. The improved servo system which forms the subject matter of the present invention is especially adapted for accomplishing this.

If the motor utilized to make the physical changes or adjustments in the circuit parameters is made to operate at a given speed only slightly in excess of that required to cope with the maximum known speed of aircrafts, for example, within the range of zero to three hundred yards per second, it is apparent that an appreciable period of time, in the order of 100 seconds for full scale deflection, will necessarily be required for moving the range-sensing indication, or dot, from a position of five thousand yards to thirty thousand yards, since the time required will be dependent upon the speed of the servo motor. It is therefore desirable that means be made available for rapidly moving the range-sensing indication into position with the received signal and to thereafter permit or allow the motor to track at a slower speed.

Accordingly, in the system illustrated, the operator is provided with slewing switches 11 and 12 which are mounted respectively on the left and right bars of the control handle bars 13. Through the manual operation of these switches, an overriding control voltage is supplied to the servo control circuit 14 embodying my invention which, in a manner that will be explained later, operates the servo motor 15 at an accelerated speed to slew the range dot into coincidence with the received signal. Servo motor 15 has mechanically connected thereto a permanent magnet generator 16 which is driven through the shafting 17 and whose output is proportional to the speed of servo motor 15. The output of generator 16 is fed to the servo control circuit 14 through the connections 18 and is delivered thereto as a bucking voltage for the purpose of damping the system. Through suitable shafting 19, phase shifting condensers 21 are driven by the servo motor 15, and in like manner Selsyn devices 22 are similarly driven through shafting 23 which transmit to the director of the system positional data for gunlaying purposes.

For automatic ranging, the system is supplied, from the radar range-sensing signal device 100, with a signal which is delivered to the servo control circuit 14. This signal automatically conditions the servo motor 15 and operates the phase-shifting condensers 21 to automatically range track the target. Similarly, signals from the regenerative range-tracking signal device 24 may be employed as will be explained in connection with the operation of my invention.

In the embodiment of my invention illustrated in FIG. 2, a pair of slewing switches 11 and 12 are shown connected across an energy source 25 which is provided with a grounded reference terminal 26. Source 25 is preferably a battery having its mid-tap grounded, its terminals having the polarities indicated with respect to ground. In the closed position, slewing switch 11 delivers a negative voltage from source 25 through a series resistor 101, a conductor 27, and resistor 28 to the control grid 29 of an electronic discharge device 31, illustrated as a triode, whose plate 32 is connected to positive source 33 and whose cathode 34 is connected to negative source 35 through a cathode resistor 36. This causes the plate current to decrease and cathode 37, which is normally substantially at ground potential, to become negative with respect to ground.

The output of tube 31 is taken from the cathode thereof at point 37 and delivered to the winding 38 of a nonpolarized relay 39 which, when energized, operates the normally open pairs of contacts 41 and 42. Under the control of switch 41, series resistor 102 is connected into or removed from the armature circuit of servo motor 15 which is supplied, in the illustrated embodiment, with alternating current from source 43. Another resistor 44 is also placed in series with the armature winding of the servo motor.

A similar voltage, but of opposite polarity with respect to ground, is applied to grid 29 of element 31 when the slewing switch 12 is in its closed position through the series resistor 45. This causes the plate current of tube 31 to increase, so that cathode 34 becomes positive relative to ground. The voltage applied to winding 38, although of opposite polarity compared with that present when switch 11 is closed, likewise energizes relay 39 and closes pairs of contacts 41 and 42, since the relay is of the non-polarized type.

In addition to providing control of electronic discharge device 31 and its associated apparatus, as above explained, closing switch 11 or 12 causes a voltage to be delivered to the modulator and amplifier circuit 46 by means of conductor 47. Here this voltage is combined with the output of permanent magnet generator 16 and used to modulate an alternating voltage from source 48, the modulated voltage being amplified and supplied to the field windings 49 and 51 of servo motor 15. Sources 43 and 48 may be a single alternating-current supply line. If they are separate sources, as shown in the drawing, they are assumed to have identical or harmonically related frequencies and a fixed phase relationship.

Automatic control is given to servo motor 15 by signals received from the radar range-sensing device or detector which are delivered to the field control circuit 46 through conductor 52, series resistor 53, and conductor 47. An error integral network comprising a resistor 54 and a condenser 55 is provided which is connected as shown.

Limits are provided for the circuit through the switches 61 and 62 which are respectively connected to the conductor 47 at points 63 and 64 through the unilateral current-conducting elements 65 and 66. Switches 61 and 62 are operated by cams 67 and 68 through the gears 69 and 70 from a shaft 85 which is connected to shaft 19 through suitable gears 86.

Aided tracking is supplied the system by the manually operated tracking means 87 which comprises a handwheel 88, a permanent magnet generator 89, and a potentiometer 91. Through the gears 92 and 93 rotation is imparted simultaneously to the permanent magnet generator 89 and arm 94 of potentiometer 91 which is provided with a winding 95.

Condensers 21 are electrically connected to the radar range-sensing detector 100 by means of a conductor 96, and signals from the system's director are supplied to the regenerative range-tracking signal device 24 through a conductor 97.

In normal operation of the system, an operator will slew the range servo motor 15 by closing either the slew switch 11 or 12, depending upon the position of the range-sensing indication or dot. Such action delivers to the field control circuit 46 an overriding voltage which slews the range-sensing indication to the right or left, depending upon which switch is closed, by means of the changed position of the phase-shifting condensers 21.

When the switch 11 is closed, a large negative voltage is supplied to grid 29 of electronic discharge device 31. Since the voltage applied through switch 11 and resistor 101 originates from source 25 which is of low impedance, it will overpower or dominate any signal that the system is receiving from the radar range-sensing detector 100, and the cathode 34 of element 31 which is normally near ground potential will be driven negatively with respect to ground and cause the contacts 41 and 42 of relay 39 to close. When contacts 41 of relay 39 are closed, resistor 102 in series with the armature winding of the servo motor 15 is shorted out, thereby increasing the speed of the motor to a rate which is in excess of the maximum speed obtained under the automatic control of signals received from the range-sensing detector 100. Also, the negative voltage which is applied to the field current-control circuit 46 will be amplified therein and will apply full field current to the windings 49 and 51 of servo motor 15.

The closing of the contacts 42 under the action of relay 39 short-circuits condenser 55 of the error integral network, thereby preventing the motor from continued operation, or coasting, after the slewing switch is opened.

The same sequence of operations will follow the closing of slewing switch 12 with the exception that motor 15 will be driven in the opposite direction, since a positive voltage is applied to control circuit 46 by means of lead 47 in this case.

When both of the switches 11 and 12 are closed simultaneously, motor 15 will stop, since the input terminal 50 of field current control circuit 46 will be substantially at ground potential.

If it is desired to track manually, switch 98 of the aided tracking device 87 is closed to contact 99, thus placing the winding 95 of potentiometer 91 and the permanent magnet generator 89 in the grid circuit of element 31. The handwheel 88 of aided tracking means 87 through the gearing 92 drives the generator 89 and positions arm 94 of potentiometer 91 to deliver to input terminal 50, as well as to the grid 29 of tube 31, a voltage whose characteristics provide the field control circuit 46 of servo motor 15 with displacement and rate changes.

As illustrated, the circuit makes it possible to accomplish manual tracking at the same rate as that for slewing. However, if it is desired to reduce the rate of manual tracking, resistors may be inserted in series with the terminal leads of winding 95 of potentiometer 91. In this manner, the voltage applied to grid 29 of tube 31 during manual tracking is made insufficient to cause the actuation of relay 39 and hence the short-circuiting of resistor 102 in series with the armature of motor 15.

It will be apparent that, under the accelerated action of servo motor 15 caused by the overriding voltage supplied from the slewing circuits, the range-sensing indication may be driven beyond the range of the indicator, that is, beyond zero or thirty thousand yards, depending upon deflection to left or right. Accordingly, the circuit is provided with electrical limits which will prevent the slewing action from being effective beyond a minimum range of, say, five hundred yards and a maximum range of twenty-eight thousand yards. Such limits are supplied to the circuit through the action of switches 61 and 62 which are connected to the field control circuit 46 through the unilateral current-conducting elements 65 and 66, illustrated as rectifiers.

When switch 61 is closed, through the displacement of the armature of motor 15 to an angular position corresponding to a range indication of approximately five hundred yards, the potential of input terminal 50 is brought close to ground through the action of rectifier 65, thereby causing motor 15 to stop. In like manner when the rotational displacement of servo motor 15 has reached the place approximately equivalent to a range of twenty-eight thousand yards, switch 62 is closed through the action of cam 68, servo motor 15 is stopped, and a maximum range limit is set.

After the range-sensing indication dot has been brought into coincidence with the signal, or approximately so, by means of the slewing circuit just described, the system will thereafter automatically track the range under the influence of signals received from the radar range-sensing detector 100. Tracking by means of the latter element is provided for the purpose of reducing the effects of fading, and spurious signals. Since regenerative reception provides "memory," the system will continue to track after the signal fades.

In the illustrated embodiment of my invention I have shown within the field control circuit 46 elements which will be required for utilizing an alternating voltage from the source 43. It is to be understood, however, that the system is not to be limited to the use of alternating voltage, since direct-current voltages may be used if desired. In such case, the field control circuit 46 comprising a modulator, an amplifier and a phase inverter would be replaced by a direct-current amplifier.

With the operation of the servo system just described, it is apparent that for range-slewing operations, servo motor 15 may be driven at a rate which will give a range slewing speed in the order of three-thousand yards per second and at the same time be operated automatically by signals received from the range-sensing detector of the system at a speed varying from zero to three hundred yards per second. Since this wide range of speeds is provided by a single motor under the control of a circuit which may be manually overridden to give an accelerated slewing speed, wide flexibility is given to the system with a minimum amount of apparatus. Likewise, manual tracking is provided for the system, through the automatic control circuit of the motor, by an aided tracking means which supplies the system with rate and displacement corrections.

In the foregoing, I have generally discussed the operation of those components of the systems shown in FIGS. 1 and 2 which are therein illustrated in block diagrams. However, in FIG. 3 I have shown more in detail circuits which may be embodied in such block diagrams. For example, in FIG. 3, I have shown a phase-difference measuring circuit associated with a radio or radar receiver and transmitter all of which correspond to the block diagram 100 in FIGS. 1 and 2 which is labelled "Radar Sensing Signaling Device." A phase-shifting network is also shown in FIG. 3 which is connected between the radio transmitter and the phase-difference measuring circuit for the purpose of adjusting the phase relation of a reference component of the transmitted signals and the received signals, and this circuit may be embodied in the block diagram 21 in FIGS. 1 and 2 which is labelled "Condensers." Similarly, I have shown in FIG. 3 a diagram of a suitable phase inverter, modulator and amplifier which may be embodied in the block diagram designated by the numeral 46 in FIG. 2. It will be understood that the wiring diagrams shown in FIG. 3 are exemplary in character and that any other suitable constructions may be substituted therefor, and, in the following, I present brief descriptions of the construction, operation and correlation of the various circuits shown in FIG. 3.

In the first place, it should be clearly understood that the system of the present invention includes, generally speaking, two controllers over the servo motor, the range tracking operation of which provides a measure of range. One control may be termed a manual control including the switches 11 and 12 hereinabove described and the associated circuit for effecting slewing operations of the servo. The other control may be termed an automatic control since signals are supplied to the servo motor amplifier which cause the servo to provide an output or displacement which is a measure of range and which varies in accordance with the variations in actual range of the object from which the received radio signals are reflected. In FIG. 3, I have shown a system which automatically controls the servo motor in the above manner.

110 indicates generally an antenna preferably having a directivity axis and which may include a parabolic reflector as shown. A transmitter 111 preferably supplies high frequency pulses to the antenna 110 which are propagated into space. Although not shown, the directivity axis of the antenna 110 is caused to scan space and when a target or distant object is selected, the reflected waves or pulses therefrom are received by the antenna 110 and conducted to a suitable receiver 112. For explanatory purposes, it may be assumed that the antenna 110, acting both as a transmitting and receiving antenna, is of a directional character although two antennas may be employed, either of which has a directional characteristic. The pulses are conveyed from transmitter 111 to antenna 110 through a suitable wave guide or coaxial line 113 and the received pulses are in part conducted through coaxial line 113 and line 114 to receiver 112, a TR box 115 being connected in line 114 to filter out the high intensity transmitter pulses and to pass the received pulses of lower intensity.

The phase relation of the pulses derived from transmitter 111 and those received in receiver 112 will be a measure of the range or distance from the instrument to the chosen target. For example, in FIG. 4, I have shown pulses 116 and 117 as the voltage wave derived from the transmitter. I have also shown pulse 118 as the received pulse, pulse 118 being the reflected energy corresponding to the transmitted pulse 116. Both of these pulses are supplied to a phase-difference measuring circuit, the output of which is a signal voltage of a polarity sense depending upon whether the received signal pulse 118 lies to one side or the other of the midpoint between pulses 116 and 117 or any other arbitrary point relative to the transmitted pulses. Under the conditions herein assumed for descriptive purposes, if the relative positions of the pulses 116, 117 and 118 should vary, the spacing between pulses 116 and 117 being a constant, the signal voltage derived from the phase-difference measuring circuit causes the servo motor to operate in a direction such that the phase-shifting network operated thereby will shift the reference pulses derived from the transmitter in a direction to center the received pulse at the midpoint between consecutive transmitted pulses. Hence, the output of the servo will constitute a measure of range which varies with variations in actual range of the object from which received pulse 118 is reflected.

Referring again to FIG. 3, it will be seen that the received signal pulse is applied on the grid of tube 119 and that a reference component of the transmitter pulse is supplied through conductors 120 to phase-shifting network 21, the output of which is supplied through conductors 121 to the grid of tube 122. Tubes 119 and 122 constitute input tubes to the phase-difference measuring circuit appearing within the rectangle 123 represented in dash lines. This circuit embodies the two tubes 124 and 125. The plates of these tubes are energized from the battery 126 feeding through resistors 127 and 128. The plate of tube 119 connects through resistor 129 with the plate of tube 124 and also through resistor 130 to the cathode of tube 119 and preferably to ground as shown. Similarly, the plate of tube 122 is connected through resistor 131 with the plate of tube 125 and through resistor 132 with the cathode of tube 122 and preferably to ground. It will be noted that the plate of tube 119 connects with resistors 129 and 130 at a common terminal 133 and that the plate of tube 122 connects with resistors 131 and 132 at a common terminal 134. Terminal 133 is connected through conductor 135 to the grid of tube 125 and terminal 134 is connected through conductor 136 with the grid of tube 124.

The above-described circuit operates as follows. Let us assume that under quiescent conditions, that is, when no signal pulse is applied to the grids of 119 or 122, the tube 125 is conducting. When a pulse of the nature of pulse 118 (FIG. 4) is applied to the grid of tube 119, the space current increases in this tube causing the potential at terminal 133 to become lowered, thereby lowering the potential on the grid of tube 125. When this occurs, the space current in tube 125 diminishes and the potential of terminal 134 increases thereby causing the tube 124 to conduct. When tube 124 conducts, the potential of terminal 133 is still further lowered thereby further diminishing the space current in tube 125 and thereby further increasing potential on the grid of tube 124 to increase the current flow therethrough. This operation of tubes 124 and 125 occurs within such an extremely short interval of time as to effect a cut-off of tube 125 and full conduction through tube 124 substantially instantaneously.

In FIG. 4, I have shown a current curve, the portion 137 of which represents the current flow in the cathode circuit of tube 125 and the portion 138 of which represents the current flow in the cathode circuit of tube 124. The cathode circuit of each of tubes 124 and 125 include the common resistor 139, connected at one end to ground. The other end of the resistor 139 is connected through series resistors 140 and 141 to the cathode of tube 124 and through series resistors 142 and 143 to the cathode of tube 125. Hence, the current represented by curve 137 lying to one side of the time axis will flow through resistor 140 and the current represented by the curve 138 lying on the other side of the time axis will flow through resistor 142 so that across resistors 140 and 142 will appear a differential voltage, the voltage across 140 being dependent on the current flow through tube 124 and the voltage across resistor 142 being dependent upon the current flow through tube 125.

It will be seen that when a pulse derived from the receiver is applied to the grid of tube 119 that current will immediately flow through the cathode circuit of tube 124 which will be of a square wave character as indicated at 138, tube 125 cutting off. Subsequently, when a pulse from the transmitter is applied to the grid of tube 122, conduction through tube 124 is immediately cut-off and tube 125 is caused to conduct, producing the similar square current wave 137. Tube 122 functions in a similar manner to tube 119 but to cut-off tube 124 and to cause tube 125 to conduct. In other words, when a pulse is applied to the grid of tube 122, the potential of terminal 134 is lowered thereby diminishing the space current in tube 124 which in turn increases the potential of terminal 133 and the potential on the grid of tube 125. This action causes tube 124 to cut-off and tube 125 to conduct.

As above indicated, when tube 125 conducts, current represented by the cure 137 flows through the cathode resistor 142 and when tube 124 conducts, current represented by the curve 138 flows through the cathode resistor 140. If the length of these current curves measured along the time axis are equal, then the received pulse 118 is situated equidistantly between the transmitted pulses 116 and 117. With the transmission and reception of periodic pulses, the phase-difference measuring circuit continuously reproduces a current output of the character represented by the curves 137 and 138. However, if the pulse 118 were to appear at the time represented by pulse 118a in dotted lines, then tube 125 would be cut-off at the point 144 on the current curve and the current curve would follow the dash line 145, the current curve becoming again reversed when reference pulse 117 is applied to the grid of tube 122. It is clear that under the latter assumed conditions, the current output from tube 124 included within the bracket 146 predominates over the current output from tube 125 represented by the bracket 147 and therefore the voltage across resistor 140 will predominate over the voltage across resistor 142.

When the opposite occurs, that is, the received pulse is received at the time represented by the pulse 118b in dash lines, then tube 125 will conduct until the point 148 is reached on the current curve whereupon it will cut-off and tube 124 will conduct, the current following the dash line 149. Under the latter assumed conditions, the voltage across resistor 142 will predominate over that across resistor 140. Therefore, the differential voltage output from the phase-difference measuring circuit or the voltages appearing at terminals 150 and 151, with respect to ground, may be utilized to control a servo motor in such a manner as to render these voltages equal or, in other words, to phase shift the reference pulses derived from the transmitter so that they lie equal distances on opposite sides of the received pulse.

In the embodiment of my invention shown in FIG. 3, I have shown a conventional phase-shifting network including the resistors 152 and 153 connected in a closed series circuit with variable condensers 154 and 155. The leads 120 from transmitter 111 are connected to apply a pulse across the resistor 152 and condenser 154 in series and across the resistor 153 and condenser 155 in series. The leads 121, which connect with the grid and cathode respectively of the input tube 122 of the phase-difference measuring circuit, are connected across resistor 155 and condenser 155 in series and also across resistor 153 and condenser 154 in series. The capacitance of these condensers is varied by the servo motor 15, the mechanical connection therebetween being represented by the dot-dash line 156.

From the foregoing, it should be apparent that under the assumed condition of operation the output of the phase-difference measuring circuit will operate through the servo motor amplifier, hereinafter described, to cause the servo motor to phase shift the reference pulses derived from the transmitter in such a direction as to produce equal intervals of time between the transmitted and received pulse and the next consecutive transmitted pulse. Under these conditions, the displacement output of the servo motor will constitute a measure of range and it will function to track the range of a target, that is, to provide a displacement in its output varying in accordance with variations or changes in range of the selected target.

In order to control the servo motor from the voltages appearing between the terminals 150 and 151 and ground, I preferably provide a converter stage so that, from the differential voltages, a single voltage may be derived proportional to the difference therebetween, but which varies one way or the other from ground potential depending upon which one of the differential voltages predominates. This function is carried out by the tube 157 to the grid of which one of the voltages, such as that appearing on terminal 151, is applied. The plate circuit of tube 157 includes resistor 158 connected at one end to said plate and at its other end with a source of negative potential. A feedback circuit including resistor 159 is connected between the grid of tube 157 and a suitable point 160 intermediate the length of resistor 158. Point 160 is connected to one end of a resistor 161 and to the end of this resistor is connected the terminal 150 of the output of the phase-difference measuring circuit. A suitable point 162 on resistor 161 connects with conductor 52 hereinabove described which supplies the signal derived from resistor 161 to the phase inverter stage of the modulator and amplifier hereinafter described. The foregoing circuit is so arranged that when the voltages appearing between terminals 150 and 151 and ground are equal, the potential at point 162 on resistor 161 will be at ground potential and when the voltage derived from terminal 150 or 151 increases over the other, the potential of point 162 will vary one way or the other from ground potential depending upon which one of the input voltages of this circuit predominates over the other.

The conductor 52 functions to apply the potential of point 162 on resistor 161 to the grid of tube 163 of a phase inverter stage including the tubes 163 and 164. The conductor 47, hereinbefore described in connection with the manual control of the servo motor, is also connected to the grid of tube 163. The grid of tube 164 is connected through a suitable resistor 165 and conductor 166 with a P.M. generator 167 which is driven by the servo motor 15. A detailed discussion of the operation of the P.M. generator to provide damping in the servo motor system is believed unnecessary.

The plates of tubes 163 and 164 of the phase inverter stage are connected to opposite ends of coupling resistors and directly through conductors 168 and 169, respectively, with the grids of tubes 170 and 171. These tubes are embodied in a modulator stage which includes the primary of an output transformer 172 and the secondary of an input transformer 173, the primary of which is connected to a suitable source of alternating current 48. The modulator stage functions to provide an alternating current output which is dependent in amplitude upon the magnitude of the unidirectional signal voltages derived from the converter stage and in phase sense upon the polarity sense of the unidirectional signal voltage or whether it is above or below ground potential.

The secondary of transformer 172 constitutes the input to an amplifier stage comprising the tubes 174 and 175. The plates of tubes 174 and 175 are energized from a suitable source of potential as indicated and the plate circuits include the differential field windings 49 and 51 of the servo motor 15. The armature of servo motor 15 is preferably energized from source 48 of alternating current, as illustrated.

With the above-described arrangement of modulator and amplifier stages, the applied signal voltage will control the direction and also the rate of operation of the servo motor 15. If the range of the distant target, as above described, were to increase, the signal voltage applied to the servo motor amplifier, as derived from the phase-difference measuring circuit and the converter stage will cause the servo motor to operate in a direction phase shifting the transmitter reference pulses in such a direction as to equalize the differential voltages appearing in the output of the phase-difference measuring circuit and thereby increasing its displacement output or the measure of range obtained therefrom. In other words, servo motor 15 will be controlled both in direction and in rate to effect range tracking of a distant object or target, and the displacement of the servo motor will be a measure of such range. Hence, such measurement may be derived directly from the output shaft of the servo or such data may be supplied to other mechanisms by means of the selsyns 22 shown as mounted on the output shaft 19 of the servo motor in FIGS. 1 and 2.

Of course, where a visual indication is desired, so that an operator may determine a large error in tracking, as when a new target is selected, a meter such as that indicated generally at 176 may be connected across the output terminals 150 and 151 of the phase-difference measuring circuit. This meter may be of a zero center, differential character, providing indications of the direction and approximate magnitude of the error between the servo motor output and actual range. Alternatively, of course, a cathode ray tube, as hereinbefore indicated, or any other desired type of indicator may be employed so that the operator will know whether to operate slewing switch 11 or 12 and may appreciate the required duration of such manual control in order quickly to bring the system into tracking condition or into a condition of sufficiently small error between servo output and actual range that automatic tracking operations may be resumed and synchronism quickly established.

Modifications of my invention are, of course, possible and may suggest themselves in view of the above disclosure. Accordingly, the representations herein made and described are to be interpreted as illustrative and not in the restrictive sense, and my invention is to be regarded as of such breadth and scope as is defined by the appended claims.

What is claimed is:

1. An automatic ranging device comprising a range-sensing circuit, control means responsive to a signal from said range-sensing circuit for automatic range tracking, manual tracking means operable through said control means for aided tracking, and slewing means operable through said control means to overpower the control initiated by signals from said range-sensing circuit.

2. An automatic ranging device comprising a range-sensing circuit, a regenerative range signal means, control means responsive to a signal from said range-sensing circuit and said regenerative range signal means, manual tracking means operable through said control means for aided tracking, and slewing means operable through said control circuit to overpower the control initiated by signals from said range-sensing circuit.

3. Apparatus susbtantially as claimed in claim 2, including limiting means for said slewing means.

4. In a range measuring and tracking system, in combination, a motor, radar means for operating said motor selectively forward or backward in accordance with the changing range of a target being tracked, and a circuit including manually operable switching means for dominating control by the radar means of the direction of rotation of said motor and for simultaneously increasing the speed of rotation of said motor regardless of its direction of rotation for the purpose of quickly adjusting range when the radar means is directed at a different target.

5. In combination, a motor, voltage-responsive means for providing rotation of said motor selectively forward or backward in accordance with the polarity of a direct input voltage applied to said means, means for controlling the speed of rotation of said motor in accordance with the magnitude but irrespective of the polarity of said input voltage, automatic means for providing a direct voltage suitable for controlling the direction of rotation of said motor but of insufficient magnitude to control its speed, manual means for providing a direct voltage of sufficient magnitude to dominate said automatic means in the control of the direction of rotation of said motor and simultaneously to control its speed, and means for applying said automatically and manually developed direct voltages to said two first-mentioned means.

6. In combination, a motor having plural windings, a source of power for a first and a second of said windings, voltage-responsive means for controlling the energization of said first winding to provide rotation of said motor selectively forward or backward in accordance with the polarity of a direct input voltage applied to said means, means for controlling the power supplied to said second winding in accordance with the magnitude but irrespective of the polarity of said input voltage, automatic means for providing a direct voltage suitable for controlling the energization of said first winding but of insufficient magnitude to control the power supplied to said second winding, manual means for providing a direct voltage of sufficient magnitude to dominate said automatic means in the control of the energization of said first winding and simultaneously to control the power supplied to said second winding, and means for applying said automatically and manually developed direct voltages to said winding control means.

7. In a radar range measuring and tracking system, circuit means for generating signals providing a measure of the range of a distant object, a displaceable circuit adjusting member included in the circuit means, the angular position of which provides a measure of range, a servo motor for operating said displaceable member, means also included in the circuit means for deriving signals proportional to the difference in measurement afforded by said first-mentioned means and the displacement of said member, means for controlling said servo motor in accordance with said signal to drive said member in a direction to zero said difference whereby the displacement of said member is a measure of range and varies in accordance with variations in actual range of said object, and manually operable means for causing said servo to operate at a relatively high rate.

8. In a radar range measuring and tracking system, circuit means for generating signals providing a measure of the range of a distant object, a displaceable circuit adjusting member included in the circuit means, the angular position of which provides a measure of range, a servo motor for operating said displaceable member, means also included in the circuit means for deriving signals proportional to the difference in measurement afforded by said first-mentioned means and the displacement of said member, means for automatically controlling said servo motor in accordance with said signal to drive said member in a direction to zero said difference whereby the displacement of said member is a measure of range and varies in accordance with variations in actual range of said object, and manually operable, signal-supply means for supplying a signal of substantially fixed value appreciably greater than the maximum signal supplied by said signal-deriving means whereby the manual control will supersede the automatic control.

9. In a radar range measuring and tracking system, circuit means for generating signals providing a measure of the range of a distant object, a displaceable circuit adjusting member included in the circuit, the angular position of which indicates a measure of range, a servo motor for operating said displaceable member, means also included in the circuit means for deriving signals proportional to the difference in measure afforded by said first-mentioned means and said displaceable member, said motor having armature and field windings and means for controlling the excitation of one of said windings in accordance with said signal to drive said servo in a direction to zero said difference whereby the displacement of said displaceable member is a measure of range and varies in accordance with variations in actual range of said object, and means for rapidly adjusting said member on slewing from one target to another, comprising a pair of push buttons operable respectively to control the excitation of both of said armature and field windings to produce operation of said servo motor at a relatively high rate.

10. In a range measuring and tracking system, a radar wave transmitter and receiver, means for measuring the phase displacement between the transmitted and received waves, means for deriving signals proportional to change in the relative phase relation of said waves, a servo motor, means for automatically controlling said servo motor in accordance with said signals, and means operated by said servo for phase displacing one of said waves relative to the other whereby the output of said servo is a measure of range to a distant object from which the received wave is reflected, and manually operable means for effecting an operation of said servo motor at a rate materially higher than that obtainable under control of said signal-deriving means for the purpose of rapidly effecting an initial adjustment of range which comprises a pair of current reversing push buttons, circuits controlled thereby operatively connected with the servo motor, and a source of potential included in the last mentioned circuits effective on the operation of either push button to operate the servo motor in the appropriate direction.

11. In a range measuring and tracking system, a radar wave transmitter and receiver, means comprising circuits controlled by the transmitter and receiver for deriving signal voltages proportional to the amount of change of phase displacement between the transmitted and received wave, an electrical servo motor having armature and field windings, means for effecting a control over the excitation of one of said motor windings by said signal voltages whereby automatically to control said motor, means operated by said servo motor for phase displacing one of said waves relative to the other whereby the output of said servo motor is a measurement of range to a distant object from which received wave is reflected, manually operable slewing means for supplying to the excitation control means a signal voltage of a magnitude appreciably greater than that derived from said signal-deriving means, and relay means responsive to the signal output of said manually operable means for controlling the excitation of both the armature and field windings of said servo motor.

12. A combination of the character recited in claim 11 in which the signal voltage derived from the manually operable, signal-supply means is of a substantially fixed amplitude but of sufficient magnitude to predominate over the signals derived from the first mentioned signal-deriving means.

13. A combination of the character recited in claim 11 in which the manually operable, signal supplying means is operable to supply signals of one or the other polarity sense, both of which are of sufficient magnitude to predominate over the signal voltages controlling said motor and derived from the first mentioned signal-deriving means, whereby manual control over said servo motor both in rate and direction may be effected without interruption of the automatic control.

14. In a range measuring and tracking system, a radar wave transmitter and receiver, means for measuring the phase displacement between the transmitted and received waves, means for deriving signals proportional to change in the relative phase relation of said waves, a servo motor, means for automatically controlling said servo motor in accordance with said signals, and means operated by said servo for phase displacing one of said waves relative to the other whereby the output of said servo is a measure of range to a distant object from which the received wave is reflected.

15. In a radar apparatus having a range measuring device including circuits controlled automatically by transmitted and reflected impulses for generating signals proportional to any deviation of the device from correct range of a target being tracked, the improvement which comprises an amplifier controlled by the signals, a servo motor controlled by the amplifier, a movable range adjusting device included in said circuits actuated by the shaft of the servo motor on receipt by the amplifier of signals from the circuits in such direction as to tend to reduce the signals to zero whereby the displacement of the adjusting device provides a measure of range, means for rapidly actuating the servo motor on the slewing of the radar apparatus from one target to another comprising a source of potential, a pair of push buttons connected respectively with opposite poles of the source and with the amplifier, the potential being effective on the operation of either push button to control the amplifier irrespective of said signals and cause the servo motor to turn in the appropriate direction at an increased rate.

16. In a radar apparatus having a range measuring device including circuits controlled automatically by transmitted and reflected impulses for generating signals proportional to any deviation of the device from correct range of a target being tracked, the improvement which comprises an amplifier having an input coupled with said circuits and controlled by said signals, a servo motor driven by the amplifier, a movable range adjusting device included in the circuits actuated by the servo motor on receipt by the amplifier of signals from the circuits in such direction as to tend to reduce the signals to zero whereby the displacement of the adjusting device provides a measure of range, means for rapidly actuating the servo motor on the slewing of the radar apparatus from one target to another which includes a source of potential, a manually operable current reversing device connected therewith effective on the operation thereof to connect at will either pole of the source to the amplifier input, the potential being effective to control the amplifier to operate the servo motor in the desired direction at an increased speed irrespective of said signals.

17. In a radar apparatus having a range measuring device including circuits controlled automatically by transmitted and reflected impulses for generating signals proportional to any deviation of the device from correct range of a target being tracked, the improvement which comprises an amplifier having an input coupled with said circuits and controlled by said signals, a servo motor driven by the amplifier, a movable range adjusting device comprising condenser means coupled to the servo motor shaft and included in said circuits, effective on the operation of the servo motor to tend to reduce the signals to zero, whereby the angular position of the condenser means provides a measure of range, means for rapidly actuating the servo motor on the slewing of the radar apparatus from one target to another which includes a source of potential, a manually operable current reversing device connected therewith, effective on the operation thereof to connect at will either pole of the source to the amplifier input, the potential being effective to override any of said signals received by the amplifier and to control the amplifier to operate the servo motor in the desired direction at increased speed.

18. In a servomotor system, a motor, a signal voltage source of reversible polarity sense and variable amplitude, signal voltage responsive means for controlling the direction of rotation of said motor in accordance with the polarity sense of said signal and at a speed dependent upon the amplitude of said signal, and a pair of manually operable, normally open switches each electrically connected with the motor control means and, respectively, with opposite polarity terminals of a voltage source of fixed magnitude and of a magnitude sufficient to dominate any maximum value of said signal voltage so that the speed of said motor may be increased over that attainable with said signal voltage and the direction of rotation of said motor may be reversed when one or the other of said switches is closed.

References Cited in the file of this patent

UNITED STATES PATENTS

| | | |
|---|---|---|
| 1,508,796 | Kaminski | Sept. 16, 1924 |
| 1,942,587 | Whitman | Jan. 9, 1934 |
| 1,954,142 | Moffett | Apr. 10, 1934 |
| 2,145,010 | Kennedy et al. | Jan. 24, 1939 |
| 2,175,009 | Anderson | Oct. 3, 1939 |
| 2,264,333 | Satterlee | Dec. 3, 1941 |
| 2,297,719 | Satterlee | Oct. 6, 1942 |
| 2,354,364 | Chapman | July 25, 1944 |
| 2,409,448 | Rost | Oct. 15, 1946 |
| 2,412,612 | Godet | Dec. 17, 1946 |
| 2,416,562 | Alexanderson | Feb. 25, 1947 |